(12) United States Patent
Thompson

(10) Patent No.: US 6,507,979 B1
(45) Date of Patent: Jan. 21, 2003

(54) DUAL-LOOP RESTRAINING DEVICE

(76) Inventor: Greg Thompson, 3400 Highlands Farm Rd., Hillsborough, NC (US) 27278

( * ) Notice: Subject to any disclaimer, the term of this patent is extended or adjusted under 35 U.S.C. 154(b) by 0 days.

(21) Appl. No.: 09/609,853

(22) Filed: Jul. 5, 2000

(51) Int. Cl.⁷ .......................... E05B 73/00; E05B 75/00; B65D 63/00
(52) U.S. Cl. .................................................. 24/16 PB
(58) Field of Search .............................. 24/16 PB, 16 R, 24/17 A, 17 AP, 17 B, 17 R; 70/14, 15, 16; 128/876, 878, 879, 881, 882; 119/769, 770, 818, 819, 857

(56) References Cited

U.S. PATENT DOCUMENTS

| | | | |
|---|---|---|---|
| 3,556,575 A | * 1/1971 | Farkas et al. | .............. 24/16 PB |
| 3,731,347 A | * 5/1973 | Caveney et al. | .......... 24/16 PB |
| D256,438 S | 8/1980 | Woods | |
| 4,910,831 A | 3/1990 | Bingold | |
| 4,951,362 A | * 8/1990 | Denemark et al. | ........ 24/16 PB |
| 4,958,414 A | * 9/1990 | Benoit | ....................... 24/16 PB |
| 4,978,091 A | * 12/1990 | Anderson et al. | ..... 24/16 PB X |
| 5,159,728 A | 11/1992 | Bingold | |
| 5,395,343 A | * 3/1995 | Iscovich | ............... 24/16 PB X |
| 5,398,383 A | 3/1995 | Bingold | |
| 5,524,945 A | * 6/1996 | Georgopoulos et al. | ..................... 24/16 PB X |
| 5,651,376 A | 7/1997 | Thompson | |
| 5,685,048 A | * 11/1997 | Benoit | ....................... 24/16 PB |
| 6,105,210 A | * 8/2000 | Benoit | ....................... 24/16 PB |

FOREIGN PATENT DOCUMENTS

| | | | | |
|---|---|---|---|---|
| DE | 2 360 992 | * | 5/1973 | ............... 24/16 PB |
| FR | 1 168 600 | * | 9/1958 | ............... 24/16 PB |
| FR | 1 417 124 | * | 10/1965 | ............... 24/16 PB |
| GB | 2 243 401 A | * | 10/1991 | ............... 24/16 PB |

* cited by examiner

*Primary Examiner*—Robert J. Sandy
*Assistant Examiner*—Ruth C. Rodriguez
(74) *Attorney, Agent, or Firm*—Coats & Bennett, P.L.L.C.

(57) ABSTRACT

A flexible tie comprises a flexible strap having a head portion and an opposing end portion. The head portion of the strap includes first and second slots. A dual-loop restraining device is formed using two straps by inserting the end portion of each strap through the first and second slots in the other strap. In use, the loops are tightened around a prisoner's arms or legs to restrain the prisoner's movement.

7 Claims, 6 Drawing Sheets

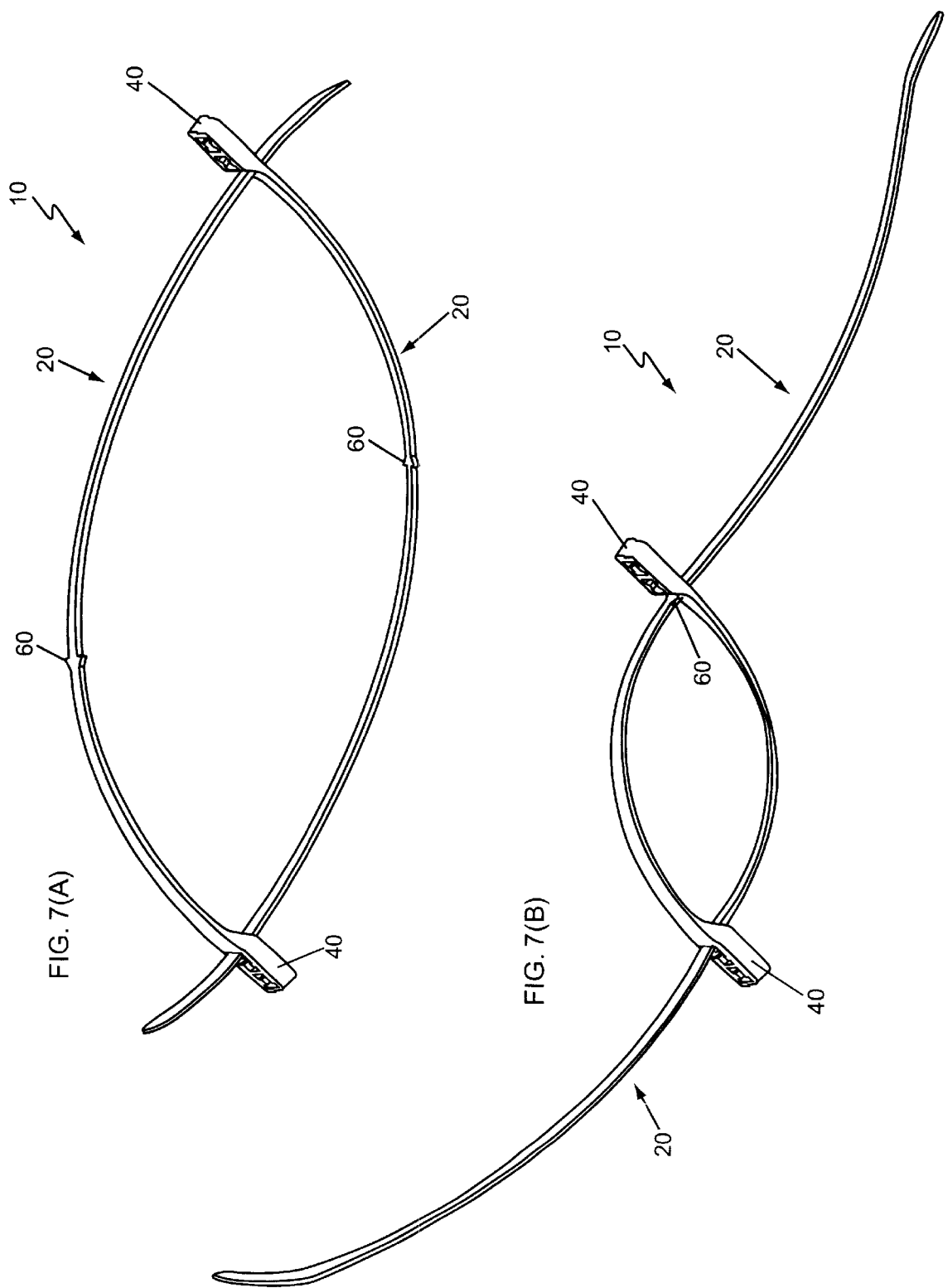

DUAL-LOOP RESTRAINING DEVICE

FIELD OF THE INVENTION

The present invention relates generally to restraining devices for use by law enforcement officials, and more particularly, to flexible, self-locking restraining ties for binding a prisoner's hands or feet.

BACKGROUND OF THE INVENTION

Conventional restraining devices used by law enforcement officials, military, and correctional officers include handcuffs for restraining a person's hands and leg irons for restraining a person's legs. These types of restraining devices typically comprise two heavy metal cuffs that are secured to one another by chains. The cuffs fit around the prisoner's arms or legs and include some form of locking device to prevent their removal.

There are certain circumstances in which an alternate form of restraining device could be useful. For example, law enforcement officials typically carry a single pair of handcuffs due to the size and weight of the handcuffs. When the law enforcement officer makes multiple arrests, there is a need for additional restraining devices. Yet it is impractical for the law enforcement officer to carry a large number of handcuffs.

Another problem encountered when using conventional restraining devices occurs when the prisoner is transferred from one law enforcement agency to another. When the transfer is made, one set of handcuffs and/or leg irons is removed from the prisoner and another set of handcuffs and/or leg irons is applied. Such close contact with the prisoner unnecessarily exposes the law enforcement officers to an attack from a potentially dangerous prisoner.

Disposable cuffs for restraining prisoners are sold by several different manufacturers. Representative examples of such devices are shown in U.S. Pat. Nos. 3,186,047 and 5,621,949. Such restraints typically comprise a flexible strap that is used to form loops around the prisoner's arms or legs. The strap includes an enlarged head portion having a slot. The free end of the strap is inserted through the slot to form a loop around the prisoner's wrist or ankle. The slot has a locking pawl that permits one-way movement of the strap. Once the strap is tightened around the prisoner's wrist or ankle, it cannot be loosened. The strap is removed by cutting the strap. To restrain a prisoner, two straps are interlocked The second strap is inserted through the loop in the first strap before it is secured in its respective slot.

Dual-loop restraining devices of the type described above are also known. Representative examples of such devices are shown in U.S. Pat. Nos. 4,910,831; 5,159,728; 5,398,383; and 5,443,155. These patents illustrate dual-loop restraining devices that include a central member having slots and two strap elements extending from opposing ends of the central member. The ends of the strap elements are inserted through the slots in the central member to form loops. The strap typically includes a series of teeth which are engaged by a pawl in the slots to lock the strap in place and prevent it from being withdrawn.

One limitation associated with the dual-loop restraining devices is that they lack any means to adjust the spacing between the loops. For particularly large and bulky prisoners with limited range of motion, the fixed spacing between loops may not be enough to allow the prisoner's hands to be cuffed behind the prisoner's back. Similar difficulty may be encountered when arresting a person with an injury or disability. Also, for a prisoner who poses a safety hazard to the law enforcement officer, it may be desirable to bind his or her hands or feet closely together to reduce the risk associated with the handling of the prisoner. On the other hand, for a prisoner who is cooperative and does not propose a risk to the law enforcement officer, it may be desirable to allow some freedom of movement for the prisoner's comfort.

Another problem with dual-loop restraining devices is that they are more costly to manufacture and have limited utility. Therefore, dual-loop restraining devices are not used as frequently as the conventional single loop restraints.

Another dual-loop restraining device is disclosed in U.S. Pat. 5,651,376 to Applicant. The '376 patent discloses a dual-loop restraining device made using two flexible ties. The flexible ties include a head portion having two slots and a strap. Each strap is formed into a loop by inserting the free end of the strap through a first slot in the head portion. The ties are then interconnected with one another by inserting the free end of each strap through a second slot in the head portion of the other strap.

U.S. Pat. Application Ser. No. 09/161,575 filed Sep. 28, 1998 by applicant also discloses a dual loop restraining device using two flexible ties. the flexible tie is this application includes a head portion and strap. The head portion includes three- slots. The flexible tie can be used singly or with another flexible tie to form a dual-loop restraining device.

The above-mentioned U.S. Pat. 5,651,376 and U.S. Pat. Application Ser. No. 09/161,575 are incorporated herein by reference.

BRIEF DESCRIPTION OF THE DRAWINGS

FIGS. 7A–7D are a series of perspective views illustrating how two straps are used to form a dual-loop restraining device.

SUMMARY OF THE INVENTION

Figure 1:
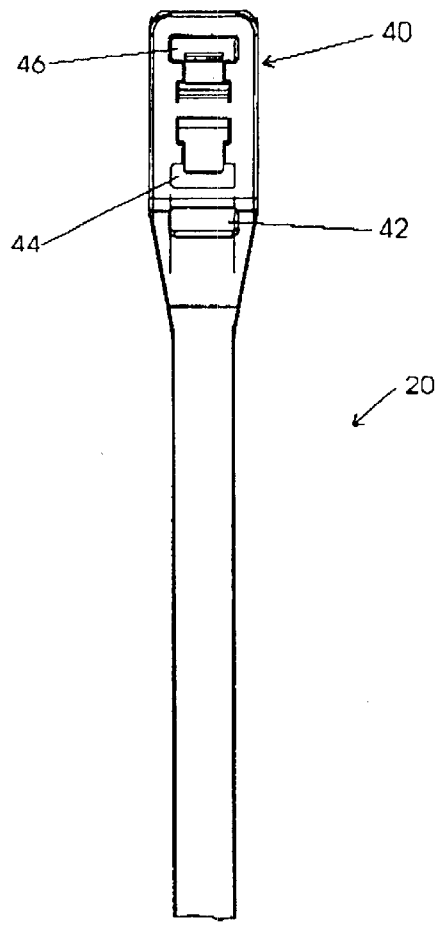
FIG. 1 is bottom plan view of a strap suitable for forming a dual-loop restraining device according to the present invention.
Figure 1:
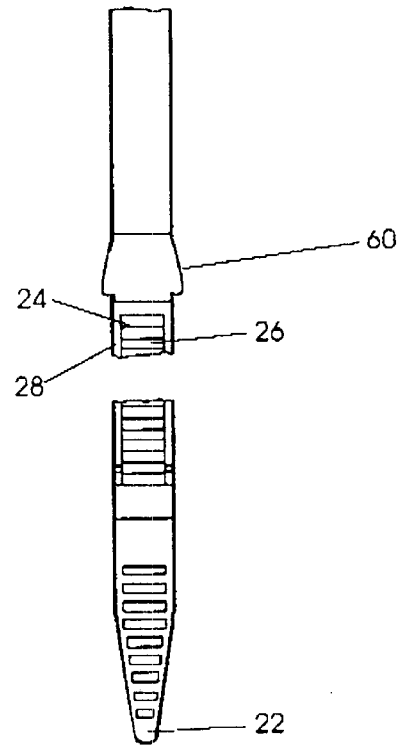
Figure 2:
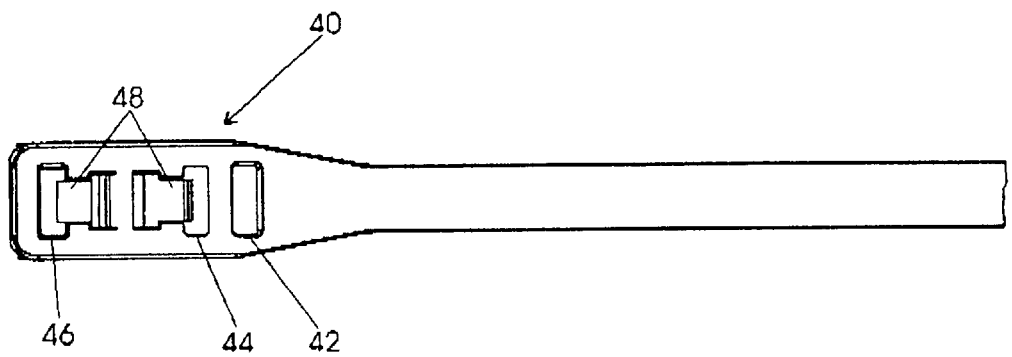
FIG. 2 is a top plan view of the head portion of the strap.
Figure 3:
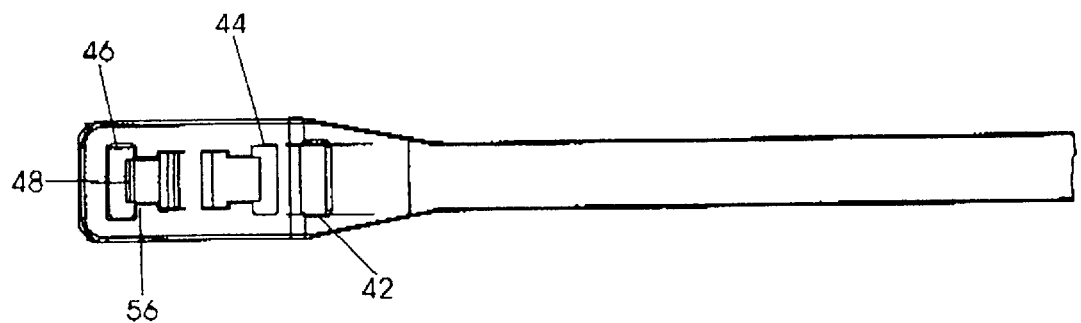
FIG. 3 is a bottom plan view of the head portion of the strap.

The present invention is a flexible, dual-loop restraining device that can be employed by law enforcement officers in place of handcuffs or leg irons. The dual-loop restraining device of the present invention comprises two flexible straps, each having an enlarged head portion at one end and an opposing insert end. At least two slots are formed in the head portion of each strap. A pawl is located in at least one of the two slots. The pawl engages the strap to allow one-way movement of the strap through the slot.

To use the restraining device, the insert end of each strap inserted through the first and second slots in the head portion of the other strap forming two interconnected loops. The loops should be of sufficient size to allow insertion of the prisoner's hands or feet into the loops. The loops are then tightened around the prisoner's arms or legs.

In one embodiment of the invention, each strap includes a stop to limit insertion of the strap through the first and second slots. The stops also serve to provide a fixed spacing between the loops of the restraining device.

The restraining device can be quickly and conveniently employed by law enforcement officers in place of handcuffs. Because the restraining device is lightweight and inexpensive to produce, a plurality of such devices can be carried by law enforcement officers. This aspect of the invention is particularly useful when the need for multiple arrests arises. Also, because the restraining device is disposable, there is no need to interchange the restraining device when a prisoner is transferred from one law enforcement agency of another.

Other objects and advantages of the present invention will become apparent and obvious from a study of the following description and the accompanying drawings, which are merely illustrative of such invention.

DETAILED DESCRIPTION OF THE INVENTION

Referring now to the Figures, the flexible, dual-loop restraining device of the present invention is shown therein and indicated generally by the numeral 10. The dual loop restraining device 10 comprises an elongated, flexible strap 20 having an enlarged head portion 40. The strap has a tapered end 22 opposite the head portion 40. The strap 20 includes a flat top surface. A channel 24 is formed in a bottom surface of the strap 20. The channel 24 includes a series of closely spaced, positive locking teeth 26 which are bounded on each side by smooth, rounded rails 28. Each of the teeth 26 includes a sloped camming surface and a substantially vertical locking surface. The channel 24 extends along the length of the strap 20 and ends approximately 4–6 inches from the head portion 40. A stop 60 is integrally formed with the strap 20 adjacent the end of the channel 24. The stop 60 in the exemplary embodiment comprises a pair of tapered projections formed on the sides of the strap 20.

The head portion 40, shown in more detail in FIGS. 2–6, includes three slots—a non-locking slot 42 and a pair of locking slots 44, 46. The non-locking slot 42 has smooth sidewalls to allow the strap 20 to move freely therein in two directions. Each locking slot 44, 46, in contrast, is designed to allow movement of the strap 20 in only a single direction. Each locking slot 44, 46 includes a pawl 48 having a series of locking teeth 50 which are designed to engage the locking teeth 26 on the strap 20. The pawl 48 allows the strap 20 to be inserted through the slot 44, 46 in only a single direction. The pawl 48 flexes away from the strap 20 as the strap is inserted into the locking slot 44, 46. When the strap 20 moves in the opposite direction, the pawl 48 locks against the strap 20 to prevent the backward movement of the strap 20. Thus, the pawl 48 prevents the withdrawal of the strap 20 from the slot 44, 46 once the strap 20 is inserted into the locking slot 44, 46. The pawls 48 in the locking slots 44, 46 are oriented to allow insertion of the strap 20 through the locking slots 42, 44 in opposite directions.

Figure 4:
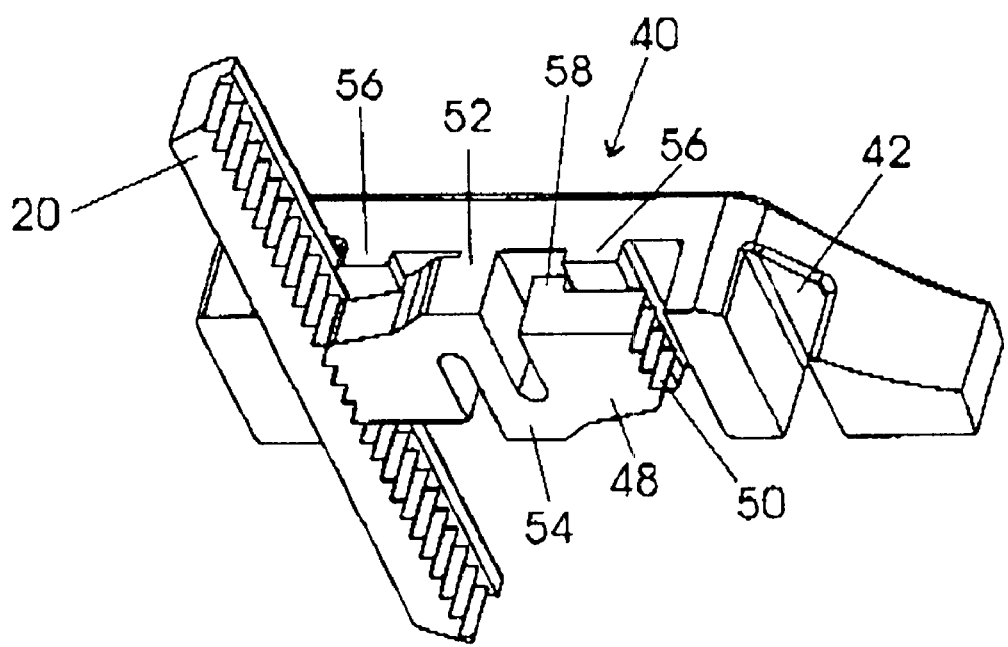
FIG. 4 is a sectional perspective view of the head portion of the strap.
Figure 5:
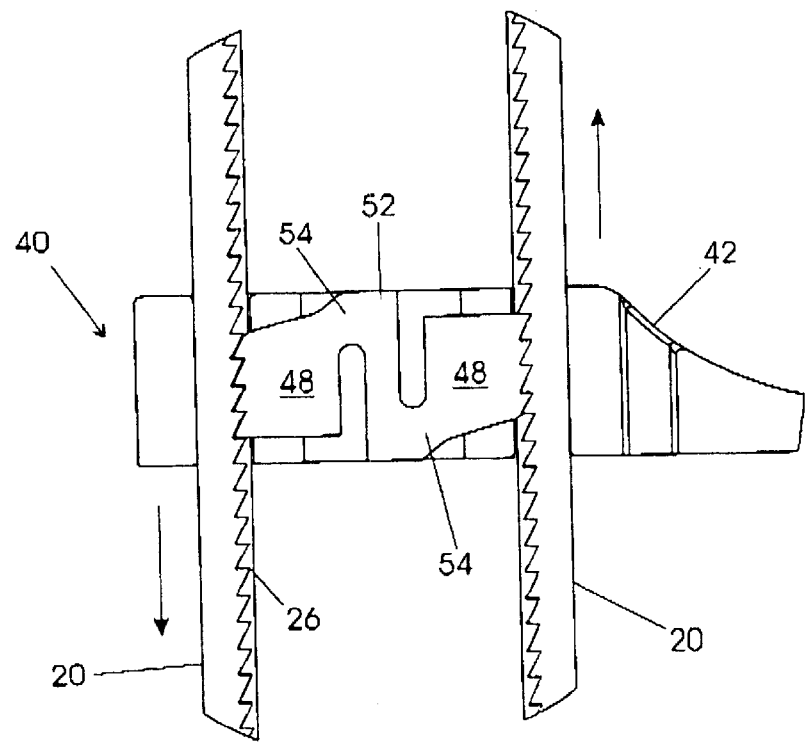
FIG. 5 is a longitudinal section view of the head portion with the flexible straps inserted through the slots in the head portion.

In the exemplary embodiment shown in FIGS. 4 and 5, the pawls 48 are integrally molded with a central section 52 of the head portion 40. Each pawl 48 includes a n arrow tie section 54 that joins the pawl to the center section 52. One potential problem is the pawl 48 may fail, i.e. be pulled through the slot, when subjected to excessive forces. To minimize this danger, the present invention incorporates a stop member 56 in each locking slot 44, 46 to keep the pawl 48 aligned in its respective slot 44, 46. The stop member 56 in the disclosed embodiment comprises a rail integrally formed with opposing sidewalls of the slot 44, 46. The pawl 48 includes a ledge 58 that contacts the stop member 56. Together, the stop member 56 and ledge 58 prevent the pawl 48 from twisting in the slot 44, 46., This feature reduces the failure rate of the pawl 48, but is not an essential element of the invention.

Figure 6:
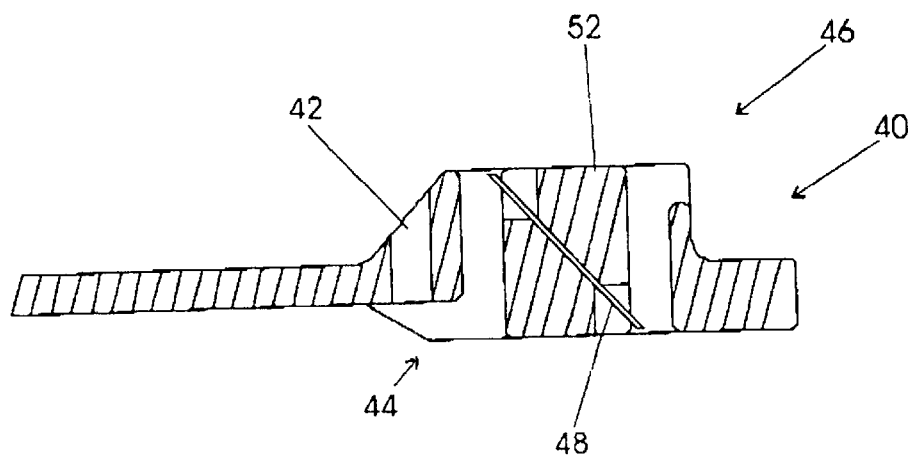
FIG. 6 is a longitudinal section view of the head portion in an alternate embodiment.

FIG. 6 shows an alternate construction for the head portion 40. In this embodiment, the pawls 48 comprise a metal barb embedded in the center portion 52 so that the ends of the barb extend into respective locking slots 44, 46.

The restraining device 10 is preferably molded as a single piece from a light-weight, thermoplastic material such as engineering grade, Nylon or polyurethane. All corners and edges are preferably radiused to ensure that the straps 20 do not cut into the prisoner's skin when tightened.

Figure 7C:
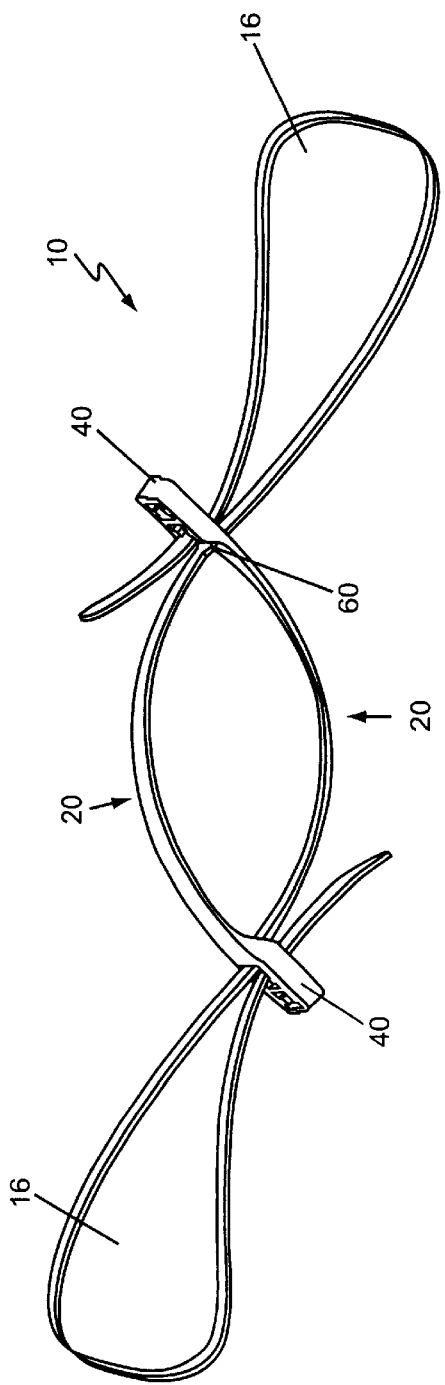
Figure 7D:
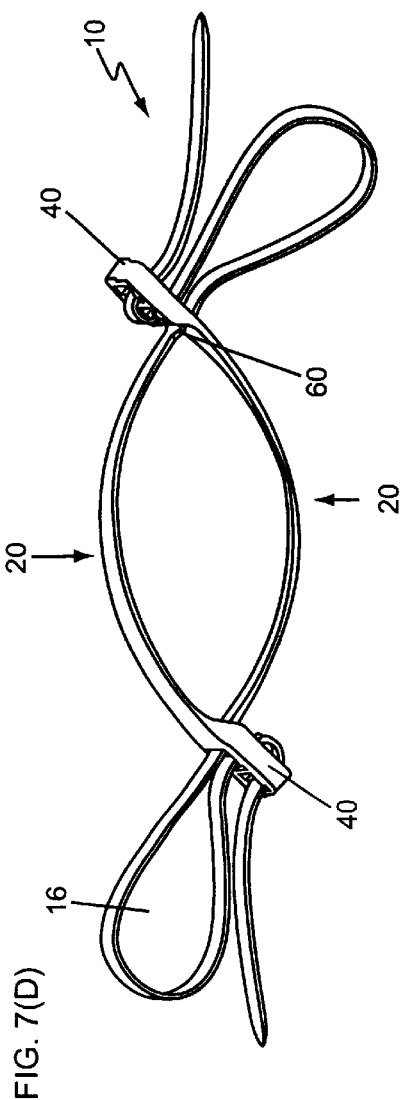

The restraining device 10 of the present invention may be conveniently used as a of handcuff or leg iron as shown in FIGS. 7A–7D. To form the adjustable cuff, the free end of each strap 20 is inserted through the non-locking slot 42 in head portion 40 of the other strap 20 as shown in FIG. 7A. The straps 20 are then pulled through until the stop 60 engages the head portion 40 of the other strap 20 as shown in FIG. 7B. The free end of each strap 20 is then formed into a loop 16 and inserted through a first locking slot 44 as shown in FIG. 7C. At this point the restraining device is applied to the prisoner by inserting the prisoner's hands or feet through the loops 16, which are then tightened around the prisoner's arm or legs. The straps are tightened by pulling the ends of the strap 20 to snug the loops 16 around the prisoner's arm or legs. Once tightened, the loops 16 cannot be loosened. The restraining device 10 can be removed only by cutting the straps 20. The free ends of the straps 20 may optionally be looped back and inserted through the second locking slot 46 as shown in FIG. 7D to provide additional strength and security.

While the disclosed embodiment shows a strap 20 with three slots 42, 44, 46, the present invention does not require all three slots. A dual-loop restraining device can be formed with only two slots in the head portion 40. Only one of two slots is required to have a pawl or other locking device. Thus, the head portion 40 could have one non-locking slot and one locking slot. Alternatively, the head portion 40 could have two locking slots without a non-locking slot.

Also, a strap 20 having a single locking slot with a stop 60 formed along its length, while not useful as a restraining device, may have other beneficial uses. A strap 20 with a single locking slot and a stop 60 could be used, for example, to form a loop of predetermined size. This could be useful to prevent over tightening the strap.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. An adjustable restraining device comprising:
   (a) first and second straps each including a head portion at one end thereof and an opposing insert end;
   (b) first and second slots formed in the respective head portions of the first and second straps;

(c) a first loop formed by inserting the insert end of the first strap through the first and second slots in the head portion of the second strap;

(d) a second loop formed by inserting the insert end of the second strap through the first and second slots in the head portion of the first strap; and (e) a pawl formed in at least one of the first and second slots to engage the strap disposed therein and to prevent the strap disposed therein from being withdrawn.

2. The restraining device of claim 1 wherein the first strap further comprises a plurality of teeth formed along the length thereof, and wherein the teeth are engaged by the pawl.

3. The restraining device of claim 1 wherein each strap further comprises a stop to limit insertion of the corresponding strap through the first and second slots.

4. The restraining device of claim 1 wherein both of said first and second slots include a pawl.

5. The restraining device of claim 4 wherein the pawl in the first slot allows one way movement through the first slot in a first direction; and wherein the pawl in the second slot allows one way movement through the second slot in a second direction, the second direction opposite the first direction.

6. The restraining device of claim 1 wherein the first slot is a non-locking slot and the second slot is a locking slot, and wherein the pawl is disposed in the locking slot.

7. The restraining device of claim 6 wherein each strap further comprised a third locking slot.

* * * * *